US009440635B2

(12) United States Patent
Sujan et al.

(10) Patent No.: US 9,440,635 B2
(45) Date of Patent: *Sep. 13, 2016

(54) SYSTEM AND METHOD OF SPEED-BASED DOWNSPEED COASTING MANAGEMENT (71) Applicant: CUMMINS INTELLECTUAL PROPERTY, INC., Minneapolis, MN (US)

(72) Inventors: Vivek A. Sujan, Columbus, IN (US); Phani Vajapeyazula, Columbus, IN (US); Kenneth Follen, Greenwood, IN (US); An Wu, Columbus, IN (US); Barty L. Moffett, Seymour, IN (US); Howard R. Frost, Columbus, IN (US)

(73) Assignee: CUMMINS INTELLECTUAL PROPERTY, INC., Minneapolis, MN (US)

( * ) Notice: Subject to any disclaimer, the term of this patent is extended or adjusted under 35 U.S.C. 154(b) by 154 days.

This patent is subject to a terminal disclaimer.

(21) Appl. No.: 14/282,874

(22) Filed: May 20, 2014

(65) Prior Publication Data
US 2014/0336887 A1 Nov. 13, 2014

Related U.S. Application Data (63) Continuation of application No. 13/336,955, filed on Dec. 23, 2011, now Pat. No. 8,731,788.

(60) Provisional application No. 61/426,984, filed on Dec. 23, 2010.

(51) Int. Cl.
*B60W 10/00* (2006.01)
*B60W 10/06* (2006.01)
(Continued)

(52) U.S. Cl.
CPC .............. *B60W 10/06* (2013.01); *B60W 10/11* (2013.01); *B60W 50/0097* (2013.01); *B60W 2030/18081* (2013.01); *B60W 2530/10* (2013.01); *B60W 2530/16* (2013.01); *B60W 2550/142* (2013.01);
(Continued)

(58) Field of Classification Search
CPC ..................................... B60W 10/06
USPC .......................................... 701/22
See application file for complete search history.

(56) References Cited

U.S. PATENT DOCUMENTS 4,368,509 A    1/1983   Li
5,231,897 A    8/1993   Morita
(Continued)

OTHER PUBLICATIONS

The International Search Report and the Written Opinion of the International Search Authority dated Apr. 17, 2012; International Application No. PCT/US2011/067269.

*Primary Examiner* — Jelani Smith
(74) *Attorney, Agent, or Firm* — Foley & Lardner LLP (57) ABSTRACT

A velocity profile can be used in conjunction with vehicle operating condition data to determine a gear shift schedule that mitigates the amount of service brake effort required to slow a vehicle by making optimal use of engine speed, friction and engine brakes. The gear shift point drives the engine to a higher operating speed and greater frictional torque, slowing the vehicle, which can then coast to a desired speed. The gear shift point can be timed to minimize fuel consumption during the maneuver. Thus, a vehicle downshift event is created based on the transmission gear recommendation. The benefit is increased freight efficiency in transporting cargo from source to destination by minimizing fuel consumption and maintaining drivability.

26 Claims, 3 Drawing Sheets (51) Int. Cl.
  *B60W 50/00* (2006.01)
  *B60W 10/11* (2012.01)
  *B60W 30/18* (2012.01)

(52) U.S. Cl.
  CPC .......... *B60W 2550/143* (2013.01); *Y02T 10/84* (2013.01); *Y10T 477/623* (2015.01); *Y10T 477/62423* (2015.01); *Y10T 477/69383* (2015.01)

(56) References Cited

U.S. PATENT DOCUMENTS

| | | |
|---|---|---|
| 5,319,555 A | 6/1994 | Iwaki et al. |
| 5,394,331 A | 2/1995 | Dudek et al. |
| 5,598,335 A | 1/1997 | You |
| 6,038,505 A | 3/2000 | Probst et al. |
| 6,154,658 A | 11/2000 | Caci |
| 6,349,253 B1 | 2/2002 | Bellinger |
| 6,356,831 B1 | 3/2002 | Michelini et al. |
| 6,374,173 B1 | 4/2002 | Ehlbeck |
| 7,742,867 B2 | 6/2010 | Liu et al. |
| 8,483,949 B2 | 7/2013 | Taguchi et al. |
| 2003/0160455 A1 | 8/2003 | Hu et al. |
| 2004/0239488 A1 | 12/2004 | Douglass et al. |
| 2005/0027423 A1 | 2/2005 | Minami et al. |
| 2005/0090940 A1 | 4/2005 | Pajakowski et al. |
| 2005/0274553 A1 | 12/2005 | Salman et al. |
| 2006/0119507 A1 | 6/2006 | Cawse |
| 2006/0185626 A1 | 8/2006 | Allen et al. |
| 2007/0017309 A1 | 1/2007 | Hasegawa et al. |
| 2007/0106442 A1 | 5/2007 | Lu |
| 2007/0112475 A1 | 5/2007 | Koebler et al. |
| 2008/0027639 A1 | 1/2008 | Tryon |
| 2008/0059036 A1 | 3/2008 | Imai et al. |
| 2008/0208393 A1 | 8/2008 | Schricker |
| 2008/0249667 A1 | 10/2008 | Horvitz et al. |
| 2008/0254937 A1 | 10/2008 | Makiyama |
| 2008/0262712 A1 | 10/2008 | Duty et al. |
| 2009/0082957 A1 | 3/2009 | Agassi et al. |
| 2009/0276267 A1 | 11/2009 | Padan |
| 2009/0319126 A1 | 12/2009 | Miyajima et al. |
| 2010/0010732 A1 | 1/2010 | Hartman |
| 2010/0023190 A1 | 1/2010 | Kumar et al. |
| 2010/0228404 A1 | 9/2010 | Link et al. |
| 2010/0287073 A1 | 11/2010 | Kocis et al. |
| 2010/0318273 A1 | 12/2010 | Aleksic et al. |
| 2011/0106388 A1 | 5/2011 | Boeckenhoff et al. |
| 2013/0096792 A1 | 4/2013 | Maier et al. |

SYSTEM AND METHOD OF SPEED-BASED DOWNSPEED COASTING MANAGEMENT

CROSS REFERENCE TO RELATED APPLICATIONS

This application is a continuation of U.S. patent application Ser. No. 13/336,955, filed Dec. 23, 2011, now U.S. Pat. No. 8,731,788, which claims the benefit of U.S. Provisional Patent Application No. 61/426,984, filed Dec. 23, 2010. The contents of both applications are hereby incorporated by reference in their entirety.

TECHNICAL FIELD

This disclosure relates to the economization of fuel consumption during vehicle operation. More particularly, this disclosure relates to balancing vehicle speed targets and gear shifting to optimize fuel consumption.

BACKGROUND

Speed regulating systems that compare actual vehicle speed to pre-set values are effective in monitoring and controlling vehicle performance over a given course. Such systems may be used in commercial vehicles, such as trucks, and noncommercial vehicles to prevent over- and under-speeding in order to improve fuel economy. Speed regulating systems generally allow a vehicle operator to select a vehicle set-speed and the system monitors actual vehicle speed in relation to the set-speed, controlling engine performance in order to maintain actual vehicle speed at the set-speed. Speed regulation is effectuated by regulating fuel flow to the vehicle's engine by detecting deviation from the set-speed and adjusting the fuel flow to reduce or eliminate the deviation. If the speed regulating system detects an under-speed condition, such as might occur while the vehicle traverses up a hill, the system commands an increase in fuel flow to increase vehicle speed. Alternatively, if the system detects an over-speed condition, such as might occur while the vehicle traverse down a hill, the system commands a decrease in fuel flow to decrease vehicle speed.

SUMMARY

According to some embodiments of the present disclosure, a method is provided for downspeed coasting management for a vehicle. The method includes accessing data indicative of at least one predetermined vehicle parameter, the at least one predetermined vehicle parameter including at least one of vehicle mass, vehicle drag, rolling resistance, resistive force at lower gear, tire circumference, front area of vehicle, powertrain torque loss, and engine friction. The method further includes accessing data indicative of at least one current vehicle operating condition, the at least one current vehicle operating condition including current vehicle speed, lower vehicle speed target to be reached, and distance to travel before reaching lower vehicle speed target. The method additionally includes accessing data indicative of at least one road terrain element, the at least one road terrain element including at least one of speed limit changes, off ramp locations, fueling locations, road grade, air density and traffic congestion. The method determines a desired rate of deceleration based on the data signifying current vehicle speed, lower vehicle speed target to be reached, and distance to travel before reaching the lower vehicle speed target to be reached, and determines a transmission gear recommendation based on the data indicative of at least one vehicle parameter, at least one current vehicle operating condition, and the desired rate of deceleration, the vehicle parameter data including data signifying engine friction, vehicle mass, vehicle drag, rolling resistance, current vehicle speed, air density and road grade. The method further includes generating an electronic recommendation signal corresponding to the transmission gear recommendation and communicating the transmission gear recommendation to a receiver.

According to other embodiments of the present disclosure, a system is provided for downspeed coasting management. The system includes a vehicle parameter module containing data indicative of at least one predetermined vehicle parameter, the at least one predetermined vehicle parameter including at least one of vehicle mass, vehicle drag, rolling resistance, resistive force at lower gear, tire circumference, front area of vehicle, powertrain torque loss, and engine friction. The system further includes a vehicle operating condition module containing data indicative of at least one current vehicle operating condition, the at least one current vehicle operating condition including current vehicle speed, lower vehicle speed target to be reached, and distance to travel before reaching lower vehicle speed target to be reached. The system additionally includes a road terrain element module containing data indicative of at least one road terrain element, the at least one road terrain element including at least one of speed limit changes, off ramp locations, fueling locations, road grade, air density and traffic congestion. And the system includes a downspeed coasting management module adapted to determine a desired rate of deceleration based on the data signifying current vehicle speed, lower vehicle speed target to be reached, and distance to travel before reaching the lower vehicle speed target to be reached, and further adapted to determine a transmission gear recommendation based on the data indicative of at least one vehicle parameter, at least one current vehicle operating condition, and the desired rate of deceleration.

Additional embodiments of the present disclosure provide a system and method for downspeed coasting management to be implemented in computer programmable software and stored in computer readable media.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The above and/or other exemplary features and advantages of the preferred embodiments of the present disclosure will become more apparent through the detailed description of exemplary embodiments thereof with reference to the accompanying drawings, in which.

Throughout the drawings, like reference numbers and labels should be understood to refer to like elements, features, and structures.

DETAILED DESCRIPTION

Exemplary embodiments of the present disclosure will now be described more fully with reference to the accompanying drawings. The matters exemplified in this description are provided to assist in a comprehensive understanding of various embodiments disclosed with reference to the accompanying figures. Accordingly, those of ordinary skill in the art will recognize that various changes and modifications of the embodiments described herein can be made without departing from the scope and spirit of the claimed inventions. Descriptions of well-known functions and constructions are omitted for clarity and conciseness. To aid in clarity of description, the terms "upper," "lower," "above," "below," "left" and "right," as used herein, provide reference with respect to orientation of the accompanying drawings and are not intended to be limiting.

In situations where an abrupt decrease in vehicle speed may occur, such as when approaching a speed limit change, road egress, traffic light or slowed traffic pattern, prior knowledge of the impending deceleration can be used to minimize fuel consumption. One deceleration technique is to coast to a stop gradually, with or without engine braking. Coasting by itself, however, may provide slower deceleration than desired and therefore be impractical. An appropriate choice of a lower transmission gear would improve deceleration and make coasting a viable alternative to using wheel brakes, thus saving brakes and avoiding fuel waste by using foresight. Operationally, it is preferable to reduce vehicle speed by creating downshifting or coasting events to reduce the need for active braking. The present disclosure balances vehicle speed targets, gear shifting and braking for optimal fuel consumption.

To effectuate balance of vehicle speed, gear shift and active braking, amongst other capabilities, applicants introduce a Cycle Efficiency Management (CEM) module that employs control processes to furnish an operator with anticipated and currently desired vehicle operational behavior to optimize fuel economy. The CEM control processes focus on powertrain components such as engine, transmission, accessories, final drive, wheels and vehicle. The processes interface with the operator to provide guidance as to appropriate vehicle speed/power targets and transmission gear selection targets. The CEM module is useful in conditioning an operator to optimize behavior based on certain performance criteria.

Figure 1:
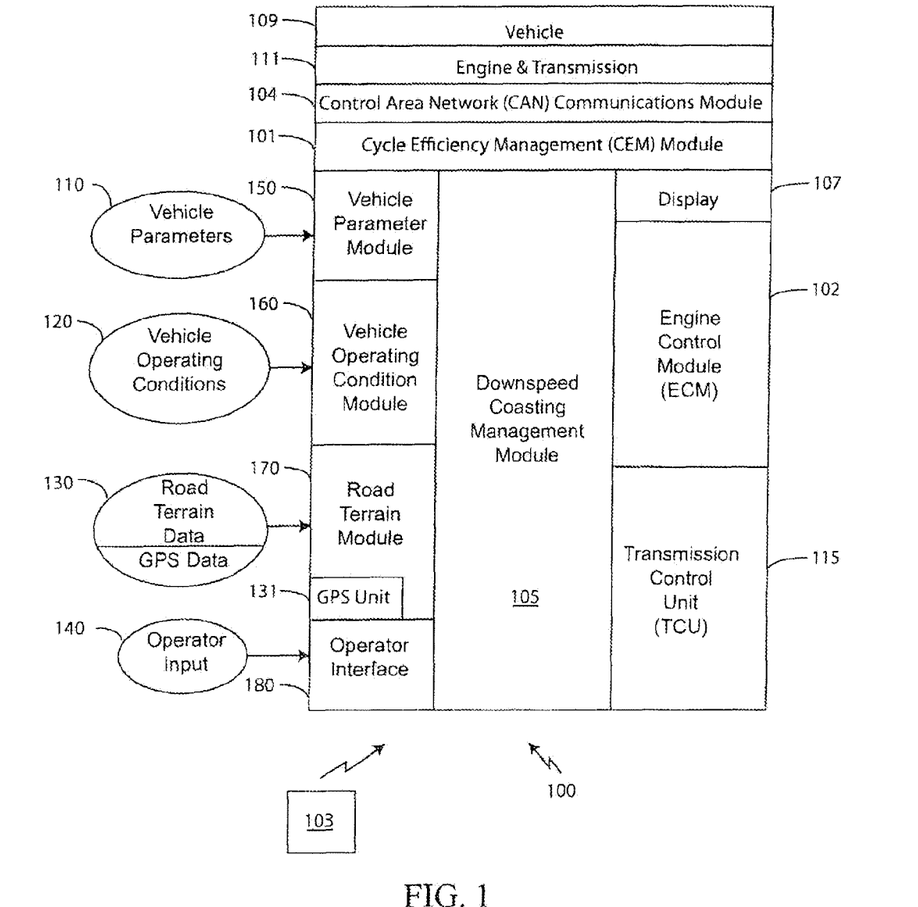
FIG. 1 is a system diagram for a downspeed coasting management system in accordance with an exemplary embodiment of the present disclosure.

FIG. 1 is a system diagram for a downspeed coasting management system 100 in accordance with an exemplary embodiment of the systems and methods of the present disclosure. System 100 is integrated into a vehicle 109, such as a truck or automobile, having an engine and transmission 111 including a plurality of gears into which the transmission can be shifted automatically by a transmission control unit 115 or manually by a driver of the vehicle. Generally, predetermined vehicle parameters 110, current vehicle operating conditions 120, and terrain profile data/information 130 are input into a CEM module 101 via control area network (CAN) communications module 104 and then used by a downspeed control management module 105 to determine a recommendation for a downshift event, i.e. shifting the transmission to a lower gear. The recommendation to shift to a lower gear is based on an expected forthcoming vehicle downspeed event and communicated to the vehicle operator and/or the vehicle transmission. In addition to other components, CEM module 101 contains downspeed control management module 105, and may also include a central processor and database. Communication equipment/modules 104 can be provided to enable input data, such as road terrain data, to be transmitted to the central processor for monitoring and control. CEM module 101 may include a vehicle parameter module 150 adapted to receive vehicle parameters 110, a vehicle operating condition module 160 adapted to receive current vehicle operating conditions 120, a road terrain module 170 adapted to receive road terrain data 130 and an operator interface 180 to receive optional operator input 140. Exemplary embodiments provide for at least a portion of the road terrain data to be provided by as GPS data to a GPS unit 131, which can supply data in advance of an operation or in real-time as the vehicle is operated. Alternate embodiments provide for road terrain data to be maintained in computer storage 103 and downloaded to the CEM module prior to the start of a trip or transmitted wirelessly over-the-air at any time, for example, by using cellular technology. The CEM module 101 enables operator input 140 in order to provide a degree of control for vehicle operators and thus improve driveability. In operation, the operator programs one or more preferences for how they wish the vehicle to behave during the course of the route. Using this control mode, the operator can, amongst other things, specify such preferences as the coasting distance desired to traverse, maximum vehicle speed, distance to use in acquiring current vehicle operating conditions (distance interval), etc. For example, if it is known that a speed change is a mile ahead and the operator desires to coast down for only half the distance, the operator can enter 0.5 mile as the distance to coast before reaching the low speed. Exemplary embodiments provide for the operator to specify preferences via display 107, and to enter them at the start of the route. The preferences might be entered as the actual desired coasting distance for any coasting event, or in the form of a table from which the operator can select a coasting distance for a given start and end coasting speed. Alternatively, the selection can be made via a slider bar indicating whether the operator would desire some percentage of the maximum possible coasting distance. Exemplary embodiments provide for an engine control module (ECM) 102 to be separate from the CEM module 101; alternate embodiments provide for the CEM module 101 and the ECM 102 to form an integrated unit. Likewise, modules 150, 160, 170, and 180 may be separate from CEM module 101.

Figure 2:
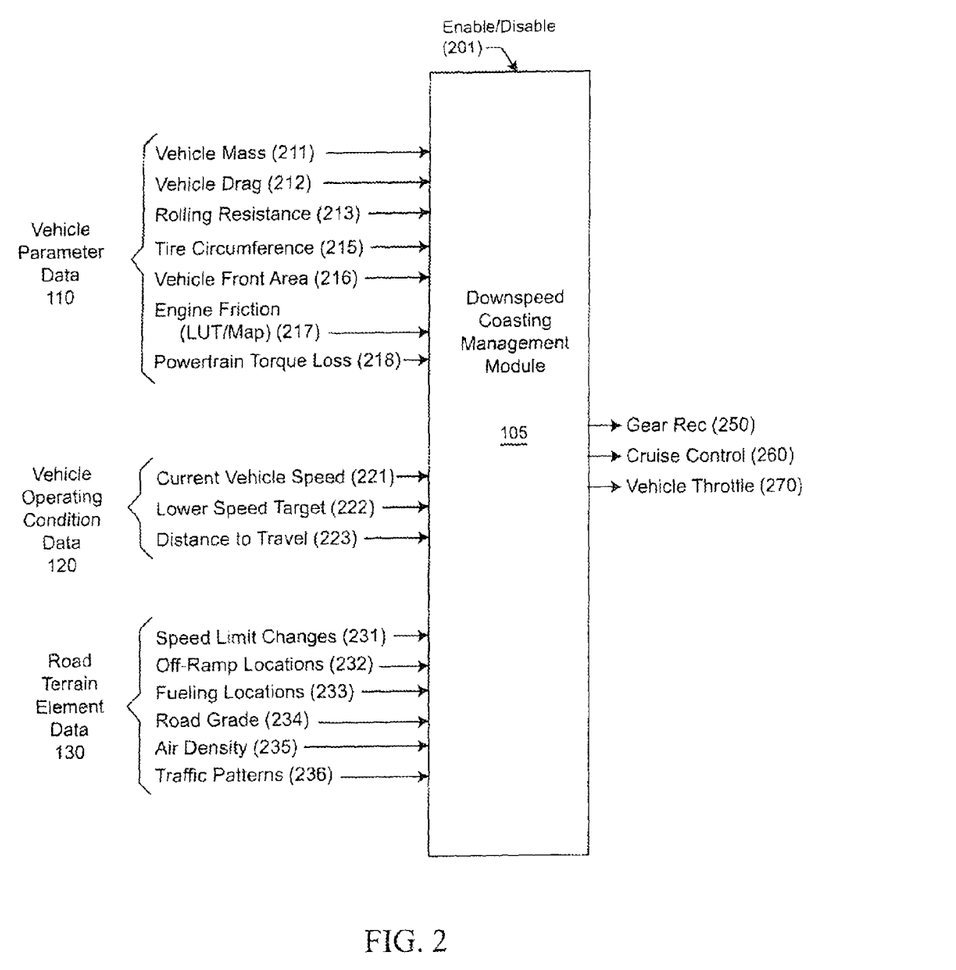
FIG. 2 is an input/output flow diagram for a downspeed coasting management module in accordance with an exemplary embodiment.

FIG. 2 is an input/output flow diagram for downspeed coasting management module 105 in accordance with an exemplary embodiment of the systems and methods of the present disclosure. FIG. 2 illustrates system inputs to the downspeed coasting management module 105, which processes the inputs to, amongst other things, determine a transmission gear recommendation 250 for downspeed coasting. System inputs are received by CEM module 101, which then enables downspeed coasting management module 105 via an enable/disable signal 201. Data indicative of at least one vehicle parameter 110 is received as an input to downspeed coasting management module 105 via CEM module 101, for example, input to the vehicle parameter module 150. The vehicle parameter data 110 includes data signifying or representing, for example, vehicle mass 211, vehicle drag 212, vehicle rolling resistance 213, drive train resistive force at lower gear 214, tire circumference 215, vehicle front area 216, engine friction 217, powertrain torque loss 218, driveline ratio, and/or axle loading, which in exemplary embodiments provide three values corresponding to loading on the steer tires, drive tires and trailer tires. The driveline ratio comprises a secondary gearing in mechanically coupling the transmission to the wheels and is available in certain but not all vehicles. When a driveline ratio is available then the ratio is considered by the vehicle operating condition management module 105 in gearing recommendations communicated to the transmission control unit 115. Vehicle parameter data may include actual values of each of these parameters such as a vehicle mass value, a drag value, and/or a rolling resistance value. Exemplary embodiments provide for engine friction data 217 to be supplied by an engine friction map look-up table (LUT) containing engine friction data obtained, for example, by engine measurements under various speed/torque combinations. Separate engine friction data is available for conditions when engine braking is enabled or when engine braking is disabled. Data indicative of at least one current vehicle operating condition 120 is also received as an input to the downspeed coasting management module 105 via CEM module 101, for example, input to the vehicle operating condition module 160. The operating condition data 120 includes data signifying or representing current vehicle speed 221, a lower vehicle speed target to be reached 222, and a distance to travel 223 before reaching/achieving the lower vehicle speed target. Exemplary embodiments provide for vehicle operating condition data 120 to be acquired via a vehicle monitoring and positional system, such as a GPS unit 131, and/or provided by the operator. Exemplary embodiments provide for operating condition data to be dynamically acquired in real-time, or through "foresight" windows of a discrete distance, such as, for example, 2 miles. In acquiring operating condition data in discrete segments, as the vehicle moves through a unit distance interval, operating condition data is acquired and the system updated. The window can be set at a predetermined default interval and/or can be adjustable by the operator. Window size is selected based upon desired data resolution and speed of processing. Data indicative of at least one road terrain element 130 is also received as an input to the downspeed coasting management module 105 via CEM module 101, for example, to the road terrain module 170. The road terrain element data 130 includes data signifying or representing speed limit changes 231, off-ramp locations 232, fueling locations 233, road grade 234, air density 235, and traffic patterns or congestion 236. Exemplary embodiments provide for speed limit and road terrain data to be furnished by data vendors, such as, for example, E-Horizon™ and NAVTEQ Traffic™ systems. Road terrain element data 130, such as route grade 234, speed limit changes 231 and fueling station locations 233 can be obtained ahead of time to provide a course snapshot of the entire route to anticipate possible downspeed coasting locations. Outputs from the Downspeed Coasting Management module 105 include a determination of a recommended gear 250, a signal to enable/disable cruise control 260, if available, and a signal to enable/disable the vehicle throttle 270.

Figure 3:
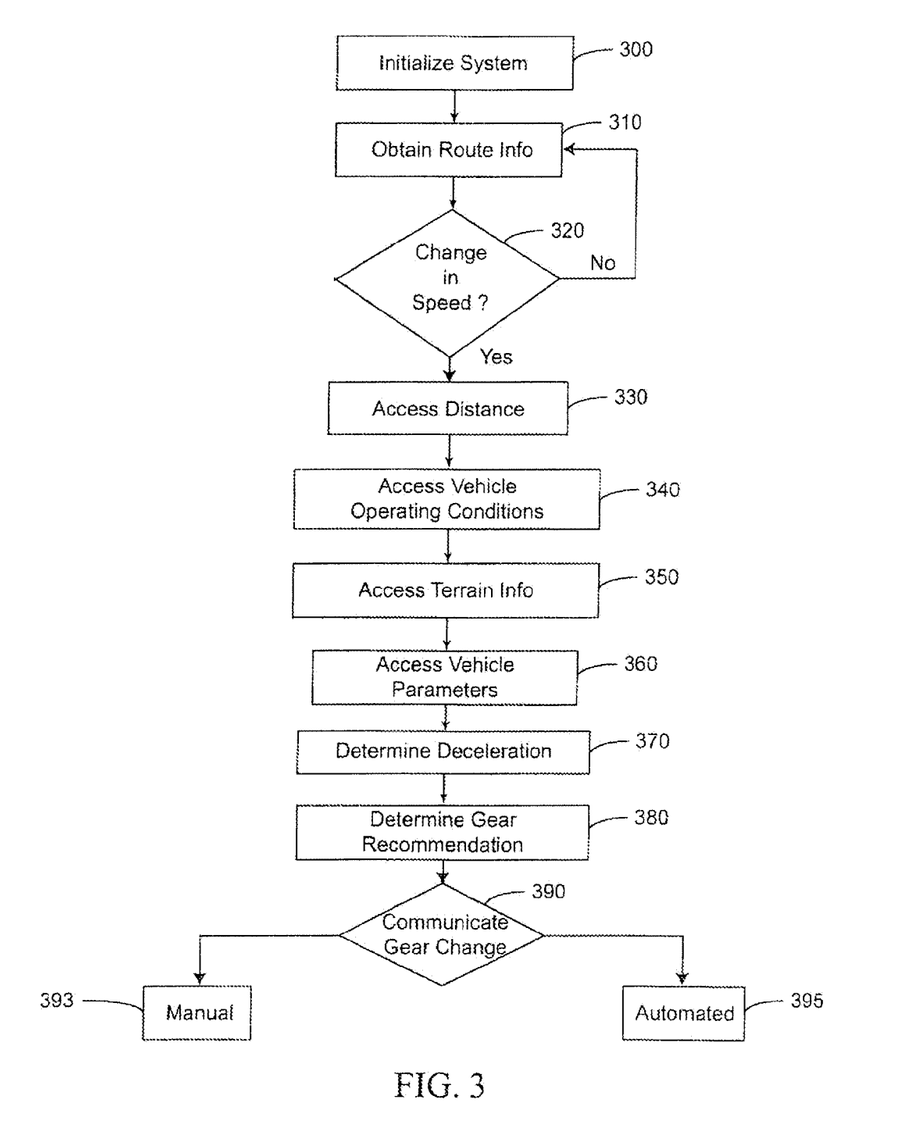
FIG. 3 is a flow diagram depicting method steps for downspeed coasting management in accordance with an exemplary embodiment.

FIG. 3 is a flow diagram depicting the steps of a method for downspeed coasting management in accordance with an exemplary embodiment. Prior to deployment, the vehicle's downspeed coasting management system 100 is initialized with known route and vehicle data, step 300. An operator, or an external source such as a central database, supplies the vehicle with a trip destination and planned route; known road terrain element data 130 are acquired via the operator, a database, or data vendor, as described above. Exemplary embodiments provide for the operator to enter vehicle parameters 110 and preferences for how the vehicle should behave on the route. Alternatively, or in conjunction with operator entry, vehicle parameters can be provided by a database containing vehicle information. Further, road terrain element data 130, such as route grade 234, speed limit changes 231 and fueling station locations 233, can be obtained ahead of time to provide a snapshot of the entire route to anticipate possible downspeed coasting locations. As the vehicle is underway, route information is obtained, step 310, via a vehicle monitoring and positional system, such as a GPS unit 131, and/or provided by the operator. Such route information confirms data obtained previously according to the planned route (step 300) and provides a basis for correction during unplanned route deviations as the route is driven. Exemplary embodiments provide for speed limit and road terrain data to be furnished by data vendors, such as, for example, E-Horizon™ and NAVTEQ Traffic™ systems, as described above.

As the route is traversed, the downspeed coasting management system 100 checks for changes in route speed, step 320. Speed changes can arise when the vehicle approaches off-ramp locations, fueling locations, changes in road grade, changes in traffic patterns or congestion, and established speed limit changes. If no current or anticipated route speed change is identified, the system 100 returns to obtain route information, step 310. When a change in speed is identified, the system 100 provides the option for the operator to supply a distance to coast in order to reach the new speed, step 330. Because the operator is aware of the environmental conditions ahead of the vehicle, this ability for the operator to supply coasting distance enhances drivability. If the operator declines to supply the coasting distance, then the system 100 provides a recommended, predicted coasting distance based on the data obtained during system initialization (step 300) and current positional information. The operator may accept, decline or modify the system provided coasting distance as conditions require.

In addition to identifying the coasting distance, data indicative of the current vehicle operating condition is accessed, step 340. Current vehicle operating conditions include, in addition to coasting distance, the current vehicle speed and the lower speed target. Exemplary embodiments provide for current vehicle speed to be obtained from instrumentation on the vehicle, such as, for example, a speedometer and/or a positional indicator, such as a GPS unit 131, which provides a measure of change relative to position over time. Data indicative of road terrain elements is accessed, step 350. Road terrain elements include, but are not limited to route grade, speed limit changes, fueling station locations, air density and traffic patterns. Data indicative of predetermined vehicle parameters is accessed, step 360. Predetermined vehicle parameters include, but are not limited to, vehicle mass, vehicle drag, vehicle rolling resistance, resistive force at lower gear, tire circumference, vehicle front area, and engine friction. Data indicative of road terrain elements and predetermined vehicle parameters are obtained primarily during system initialization, step 300, but can be updated or changed at any time by the operator or via network communication, such as wireless over-the-air transmissions.

A velocity profile can be used in conjunction with operating condition data to determine a gear shift schedule that mitigates the amount of service brake effort required to slow a vehicle by making optimal use of engine speed, friction and engine brakes. The shift point drives the engine to a higher operating speed and greater frictional torque, slowing the vehicle, which can then coast to a desired speed. Determining the desired rate of vehicle deceleration $$\frac{dv}{dt},$$

step 370, can be arrived at by determining a difference between a function of the lower vehicle speed target $v_{Low\ Speed}$ and the current vehicle speed $v_{Current\ Speed}$, over or divided by a function of the distance to travel before reaching the lower vehicle speed target $d_{Low\ Speed}$. Exemplary embodiments utilize Newton's equation of motion to obtain Equation I:

$$v_{Low\ Speed}^2 - v_{Current\ Speed}^2 = 2\frac{dv}{dt}d_{Low\ Speed},$$

from which the rate of deceleration can be determined:

$$\frac{dv}{dt} = \frac{v_{Low\ Speed}^2 - v_{Current\ Speed}^2}{2d_{Low\ Speed}} \quad \text{Equation 1}$$

Determining a transmission gear recommendation $G_{rec}$, step 380, involves determining a difference between a product of vehicle mass m and desired rate of deceleration $$\frac{dv}{dt}$$

and a product of air density ρ and vehicle drag $C_d$ and a function of current vehicle speed $v_{Current\ Speed}$. This sum is further reduced by a product of rolling resistance $C_{rr}$, vehicle mass m and a first function of route grade g cos(θ) and a product of vehicle mass in and a second function of route grade g sin(θ). The total difference is applied as a product against a function of engine friction ø, resulting in Equation II.

Exemplary embodiments derive the determination of the transmission gear recommendation according to:

$$m\frac{dv}{dt} = F_{engine} - F_{brake} - \rho C_d A v_{Current\ Speed}^2 - C_{rr}\ mg\cos(\theta) - mg\sin(\theta)$$

It is recommended that fueling be stopped during deceleration (that is, the throttle is cut), thus
$F_{engine}=0$. Further, $F_{brake}=ø\ (G_{rec}, v_{Current\ Speed})$; which is a function of a selected lower gear ratio. Thus, $$m\frac{dv}{dt} = -ø(G_{rec}, v_{Current\ Speed}) - \quad \text{Equation II}$$

$$\rho C_d v_{Current\ Speed}^2 - C_{rr}mg\cos(\theta) - mg\sin(\theta),$$

thus $$G_{rec} = ø_{v_{Current\ Speed}}^{-1}$$

$$\left\{-m\frac{dv}{dt} - \rho C_d v_{Current\ Speed}^2 - C_{rr}mg\cos(\theta) - mg\sin(\theta)\right\},$$

where $G_{rec}$ is the recommended gear, where ø can be determined by engine friction map look-up tables (LUT).

The determined transmission gear recommendation can then be communicated to a receiver, such as transmission control unit 115 and/or display 107, to effect the gear change, step 390. Exemplary embodiments provide for generating an electronic recommendation signal corresponding to the transmission gear recommendation. Certain embodiments provide for the recommendation signal to be communicated to a transmission control unit, step 395; other embodiments provide for the recommendation signal to be communicated to display 107 for manual action by the operator, step 393; still other embodiments provide for the recommendation signal to be communicated to engine control module 102 for automated control. Display 107 can be a touch-screen interface for convenient data entry. Exemplary embodiments provide for alternate modes of feedback to the operator, including audio signals, haptic feedback through throttle pedal, gear shifter and/or cruise control switches. Exemplary embodiments provide for automated control of system 100 via module 105, manual control by the operator, or a combination whereby some actions are automatically controlled and others are controlled by operator input. After the transmission gear recommendation is determined and communicated, the system 100 disables the cruise control system, if any, and cuts the throttle. As a safety measure, throttle control can be reinstated to the operator by a simple action, such as tapping the brakes or pressing the accelerator. Exemplary embodiments provide for disabling the downspeed coasting management system 100 in response to an operator-initiated event, such as, for example, as tapping the brakes or pressing the accelerator. Exemplary embodiments provide for module 105 to provide a recommendation for the operator to disable cruise control and remove his or her foot from the throttle for a coasting event. This recommendation can be communicated via display 107. Disabling output signals include transmission gear, throttle and cruise control disable.

Exemplary embodiments provide a system for downspeed coasting management. The system includes a vehicle parameter module containing data indicative of at least one predetermined vehicle parameter, the at least one predetermined vehicle parameter including at least one of vehicle mass, vehicle drag, rolling resistance, resistive force at lower gear, tire circumference, front area of vehicle, powertrain torque loss, and engine friction. The system further includes a vehicle operating condition module containing data indicative of at least one current vehicle operating condition, the at least one current vehicle operating condition including current vehicle speed, lower vehicle speed target to be reached, and distance to travel before reaching lower vehicle speed target to be reached. The system additionally includes a road terrain element module containing data indicative of at least one road terrain element, the at least one road terrain element including at least one of speed limit changes, off ramp locations, fueling locations, road grade, air density and traffic congestion. And the system includes a downspeed coasting management module adapted to determine a desired rate of deceleration based on the data signifying current vehicle speed, lower vehicle speed target to be reached, and distance to travel before reaching the lower vehicle speed target to be reached, and further adapted to determine a transmission gear recommendation based on the data indicative of at least one vehicle parameter, at least one current vehicle operating condition, and the desired rate of deceleration.

Exemplary embodiments provide a system and method for downspeed coasting management to be implemented in computer programmable software and stored in computer readable media. Such an embodiment would comprise a computer readable storage medium encoded with computer executable instructions, which, when executed by a processor, perform the method for downspeed coasting management as disclosed above. Also, many aspects of the disclosure are described in terms of sequences of actions to be performed by elements of a computer system or other hardware capable of executing programmed instructions. It will be recognized that in each of the embodiments, the various actions could be performed by specialized circuits (e.g., discrete logic gates interconnected to perform a specialized function), by program instructions (software), such as program modules, being executed by one or more processors, or by a combination of both. Moreover, the disclosure can additionally be considered to be embodied within any form of computer readable carrier, such as solid-state memory, magnetic disk, and optical disk containing an appropriate set of computer instructions, such as program modules, and data structures that would cause a processor to carry out the techniques described herein. A computer-readable medium would include the following: an electrical connection having one or more wires, magnetic disk storage, magnetic cassettes, magnetic tape or other magnetic storage devices, a portable computer diskette, a random access memory (RAM), a read-only memory (ROM), an erasable programmable read-only memory (EPROM or Flash memory), or any other medium capable of storing information. It should be noted that the system of the present disclosure is illustrated and discussed herein as having various modules and units which perform particular functions. It should be understood that these modules and units are merely schematically illustrated based on their function for clarity purposes, and do not necessarily represent specific hardware or software. In this regard, these modules, units and other components may be hardware and/or software implemented to substantially perform their particular functions explained herein. The various functions of the different components can be combined or segregated as hardware and/or software modules in any manner, and can be useful separately or in combination. Thus, the various aspects of the disclosure may be embodied in many different forms, and all such forms are contemplated to be within the scope of the disclosure.

While various embodiments in accordance with the present disclosure have been shown and described, it is understood that the disclosure is not limited thereto. The present disclosure may be changed, modified and further applied by those skilled in the art. Therefore, this disclosure is not limited to the detail shown and described previously, but also includes all such changes and modifications.

What is claimed is:

1. A system, comprising:
    an internal combustion (IC) engine operably coupled to a vehicle;
    a transmission operably coupled to the IC engine, the transmission having a plurality of selectable gears; and
    a control module coupled to the IC engine and through a network to the transmission, the control module configured to:
        determine a desired deceleration rate;
        determine a transmission gear recommendation, the determination of the transmission gear recommendation based on a product of a function of friction of the IC engine and a sum of functions related to vehicle parameters, the functions related to vehicle operating conditions comprising a negative value of each of: a product of vehicle mass and the desired deceleration rate; a product of air density, vehicle drag, and a function of a current vehicle speed; a product of rolling resistance, the vehicle mass, and a first function of road grade; and a product of the vehicle mass and a second function of the road grade; and
        communicate the transmission gear recommendation to a receiver so as to facilitate a gear change.

2. The system of claim 1, wherein the desired deceleration rate is based on a difference between a function of a lower vehicle speed target and the current vehicle speed divided by a function of a distance to coast before reaching the lower vehicle speed target.

3. The system of claim 2, wherein at least one of the current vehicle speed, the lower vehicle speed target, and the distance to coast before reaching the lower vehicle speed target is acquired in real-time through a foresight window of a discrete distance interval.

4. The system of claim 3, wherein the distance interval is predetermined.

5. The system of claim 3, wherein the distance interval is provided by the operator.

6. The system of claim 2, wherein the desired deceleration rate is determined according to the equation $$\frac{dv}{dt} = \frac{v_{Low\ Speed}^2 - v_{Current\ Speed}^2}{2d_{Low\ Speed}}.$$

7. The system of claim 1, wherein the transmission gear recommendation is determined according to the equation $$G_{rec} = \phi_{v_{Current\ Speed}}^{-1} \left\{ -m\frac{dv}{dt} - \rho C_d v_{Current\ Speed}^2 - C_{rr} mg\cos(\theta) - mg\sin(\theta) \right\}.$$

8. The system of claim 1, wherein the friction of the IC engine is determined via a look-up table based on at least the current vehicle speed.

9. The system of claim 1, wherein at least one of the current vehicle speed, the lower vehicle speed target, and the distance to coast before reaching the lower vehicle speed target is provided by a vehicle operator.

10. The system of claim 1, wherein the determining of the transmission gear recommendation is further based on vehicle axle loading.

11. The system of claim 1, wherein the control module is further configured to generate an electronic recommendation signal corresponding to the transmission gear recommendation, wherein the transmission gear recommendation is communicated to the receiver via the electronic recommendation signal.

12. The system of claim 11, wherein the receiver is a transmission control unit.

13. The system of claim 11, wherein the receiver is an engine control module.

14. The system of claim 11, wherein the receiver includes a display adapted to indicate the transmission gear recommendation to a vehicle operator.

15. The system of claim 14, wherein the display comprises a touch-screen interface.

16. A system adapted for downspeed coasting management for a vehicle, comprising:

a communications module; and a control module coupled to an internal combustion engine, the control module comprising memory having instructions stored therein and at least one processor structured to execute the instructions;

the memory comprising:

a vehicle parameter module containing data indicative of at least one predetermined vehicle parameter, the at least one predetermined vehicle parameter including at least one of vehicle mass, vehicle drag, vehicle rolling resistance, and engine friction;

a vehicle operating condition module containing data indicative of at least one current vehicle operating condition, the at least one current vehicle operating condition including a current vehicle speed, a lower vehicle speed target, and a distance to coast before reaching the lower vehicle speed target;

a road terrain element module containing data indicative of at least one road terrain element, the at least one road terrain element including at least one of road grade and air density; and a downspeed coasting management module;

the instructions comprising instructions for the processor to determine a transmission gear recommendation based on the predetermined vehicle parameter data, the current vehicle operating condition data, the road terrain data and a desired deceleration rate; and the communications module structured to communicate the transmission gear recommendation to a receiver so as to facilitate a gear change;

wherein the determining of the desired transmission gear recommendation is based on a function of the engine friction; a product of the vehicle mass and the desired deceleration rate; a product of the air density, the vehicle drag, and a function of the current vehicle speed; a product of the rolling resistance, the vehicle mass, and a first function of the road grade; and a product of the vehicle mass and a second function of the road grade.

17. The system of claim 16, wherein the determining of the desired deceleration rate is based on a difference between a function of the lower vehicle speed target and the current vehicle speed divided by a function of the distance to coast before reaching the lower vehicle speed target.

18. The system of claim 16, wherein the downspeed coasting management module is adapted to generate an electronic recommendation signal corresponding to the transmission gear recommendation.

19. The system of claim 16, wherein at least one of the data indicative of at least one current vehicle operating condition is provided by a vehicle operator.

20. The system of claim 16, wherein the at least one predetermined vehicle parameter further comprises vehicle axle loading.

21. A method performed by a control module comprising at least one memory and at least one processor, the at least one memory storing at least instructions, the at least one processor configured to execute the instructions, the method, comprising:

accessing data indicative of at least one predetermined vehicle parameter, the predetermined vehicle parameter including at least one of vehicle mass, vehicle drag, vehicle rolling resistance, and engine friction;

accessing data indicative of at least one current vehicle operating condition, the vehicle operating condition including current vehicle speed, lower vehicle speed target, and distance to coast before reaching lower vehicle speed target;

accessing data indicative of at least one road terrain element, the at least one road terrain element including at least one of road grade and air density;

determining a desired deceleration rate;

determining a transmission gear recommendation based on: a function of the engine friction; a product of the vehicle mass and the desired deceleration rate; a product of the air density, the vehicle drag, and a function of the current vehicle speed; a product of the rolling resistance, the vehicle mass, and a first function of the road grade; and a product of the vehicle mass and a second function of the road grade; and communicating the transmission gear recommendation to a transmission control unit or an engine control module to effect a gear change.

22. The method of claim 21, wherein the determining of the desired deceleration rate is based on a difference between a function of the lower vehicle speed target and the current vehicle speed divided by a function of the distance to coast before reaching the lower vehicle speed target.

23. The method of claim 21, the operations further comprising disabling the downspeed coasting management program code in response to an operator-initiated event.

24. The method of claim 21, wherein the receiver is a transmission control unit.

25. The method of claim 21, wherein the receiver is an engine control module.

26. The method of claim 21, wherein the receiver includes a display adapted to indicate the transmission gear recommendation to a vehicle operator.

* * * * *